Oct. 30, 1962     R. F. E. STEGEMAN     3,060,802
OPHTHALMIC MOUNTING
Filed May 13, 1959
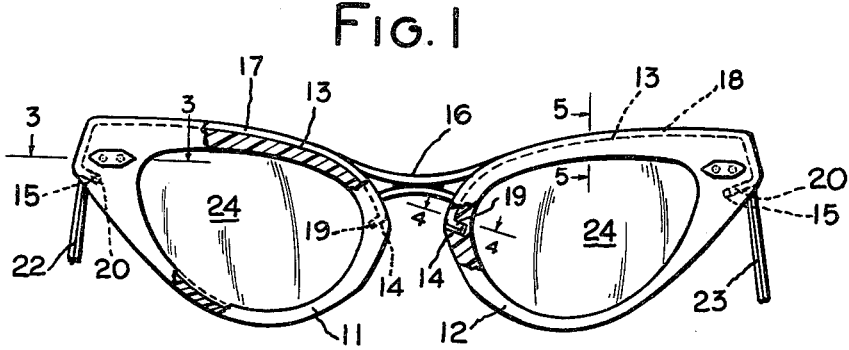
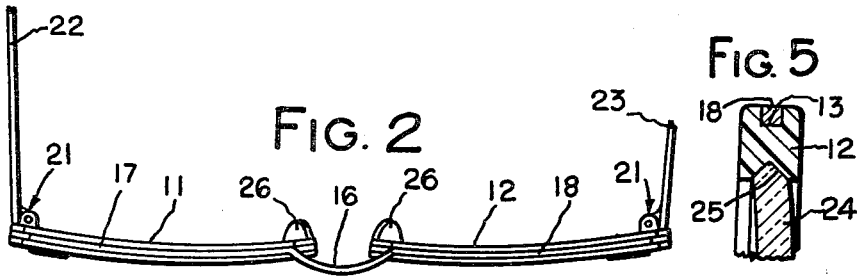
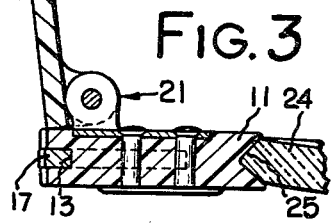 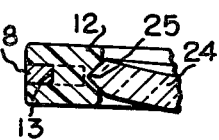 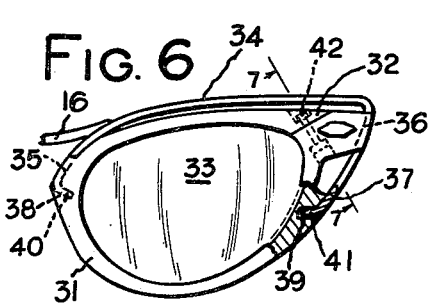
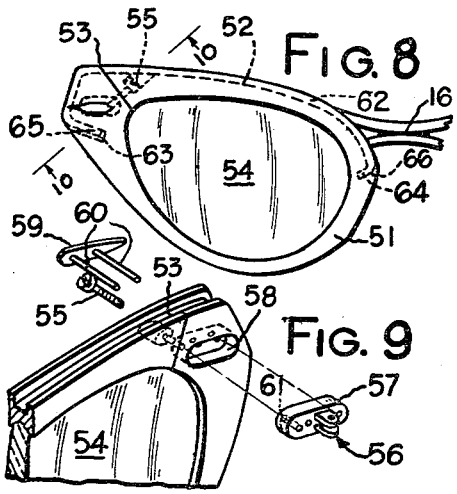 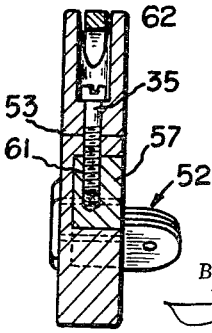
INVENTOR.
R. F. E. STEGEMAN
BY
Frank C. Parker
ATTORNEY

United States Patent Office 3,060,802
Patented Oct. 30, 1962

3,060,802
OPHTHALMIC MOUNTING
Raymond F. E. Stegeman, Greece, N.Y., assignor to Bausch & Lomb Incorporated, a corporation of New York
Filed May 13, 1959, Ser. No. 813,022
1 Claim. (Cl. 88—41)

This invention relates to ophthalmic mountings and is more particularly concerned with ophthalmic mountings composed of interchangeable parts.

Due to the great range of sizes of the faces of people who wear eyeglasses, the problem of manufacturing frames for properly fitting everyone is substantial. The present invention has for a principal object the provision of an ophthalmic mounting composed of separate, and to a certain extent, interchangeable, frame members which facilitate making up the frames by the dispensing optician without the necessity of having such a large inventory of complete frames.

A more detailed object of the present invention is to provide a multi-part ophthalmic frame comprising a bridge member having generally oppositely directed spring members secured thereto for respectively gripping separate lens rims in order to hold the entire ophthalmic mounting in assembly.

The foregoing objects and numerous advantages of the present invention will become apparent from the following detailed description when read in conjunction with the appended drawing wherein:

FIG. 1 is a front elevation of an ophthalmic mounting constructed in accordance with the principles of the present invention;

FIG. 2 is a top plan view of the ophthalmic mounting shown in FIG. 1;

FIG. 3 is a fragmentary sectional view taken substantially along the line 3—3 in FIG. 1 and looking in the direction of the arrows;

FIG. 4 is a fragmentary sectional view taken substantially along the line 4—4 in FIG. 1 and looking in the direction of the arrows;

FIG. 5 is a fragmentary sectional view taken substantially along the line 5—5 in FIG. 1 and looking in the direction of the arrows;

FIG. 6 is a fragmentary front elevation, except for certain sectionalized portions, of a slightly modified form of ophthalmic mounting utilizing the principles of the present invention;

FIG. 7 is a sectional view taken along the line 7—7 in FIG. 6 and looking in the direction of the arrows;

FIG. 8 is a fragmentary front elevation of a second modification of the present invention;

FIG. 9 is a blown-up fragmentary view shown approximately in perspective and illustrating certain constructional details of the embodiment shown in FIG. 8; and FIG. 10 is a sectional view taken substantially along the line 10—10 in FIG. 8 and looking in the direction of the arrows.

With reference now to the drawing wherein like reference numerals have been used in the different views in order to identify identical parts, and with particular reference to the first embodiment of the invention, as disclosed in FIGS. 1-5, an ophthalmic mounting comprising left and right lens rims 11 and 12 is shown. Each of the lens rims 11 and 12 is formed of a non-metallic material, such as Zylonite, Celluloid, or some other known plastic material suitable for making ophthalmic mountings. Each of the lens rims 11 and 12 is formed with a channel or groove 13 which extends substantially across the top of the lens rim and terminates at its inner end in an opening 14 and at is outer end in an opening 15. A conventional bridge member 16, preferably formed of a somewhat rigid metal, is formed with a pair of integral generally oppositely directed spring members 17 and 18 which respectively are received within the channel 13 of the lens rims 11 and 12. The spring members 17 and 18 terminate at their inner ends in a pair of tangs 19 adapted to be received within openings 14 and in a pair of tangs 20 which are adapted to be received within openings 15. The spring members 17 and 18 extend around the ends of the lens rims 11 and 12 and thereby provide the desired rigidity for the lens rims 11 and 12 so as to minimize the tendency of the lens rims to pivot relative to the bridge 16.

Each of the lens rims 11 and 12 is provided with an associated hinge member 21 for respectively connecting temples 22 and 23 with the left and right lens rims 11 and 12.

Each of the lens rims 11 and 12, being of a plastic material, is somewhat resilient and, when heated slightly, permits the insertion of a lens 24 therein, the lens rims 11 and 12 being beveled as indicated at 25 to form a groove for the reception of the lenses 24. Each of the lens rims 11 and 12 is also provided with a nose pad 26.

By providing an assortment of sizes of bridge members 16 and an assortment of sizes of lens rims 11 and 12 and temples 22 and 23, it is possible for the dispensing optician to assemble the different parts of the proper sizes to accommodate the facial characteristics of the different patients for the eyeglasses. Thus, the over-all inventory of the dispensing optician may be minimized relative to the quantities of frames which it would be necessary to stock in the event the frames were of conventional unitary construction.

The features of the present invention are believed to be equally applicable to ophthalmic mountings comprising lens rims formed of metallic members, such as aluminum for example, which is slightly less resilient than the plastic frames. The embodiments of the invention shown in FIGS. 6-10 illustrate these forms and the modification shown in FIGS. 6 and 7 will first be described. A lens rim 31, which is preferably formed of some metal such as aluminum, is split, as indicated at 32, in order to accommodate the insertion of a lens 33 therein and a minimum length of channel is provided for receiving a spring member 34 therein. The channel within which the spring member 34 is disposed is composed of three portions 35, 36 and 37. The channel portion 35 terminates in an opening 38 and the channel portion 37 terminates in an opening 39 whereby tangs 40 and 41 of spring member 34 are respectively received within the openings 38 and 39 for securing the spring members 34 relative to the lens rims 31.

In order to hold the split lens rim 31 together, a small connecting bolt 42 is adapted to be received within a suitable opening which extends through the abutting portions of the lens rim on opposite sides of the split 32. A hinge member 43 is connected to the lens rim 31 in a conventional manner in order for pivotally mounting a temple (not shown) thereon. When the spring member 34 is disposed within channel portions 35, 36 and 37 and with its tangs 38 and 39 received within openings 40 and 41, there is a minimum of tendency for the lens rims 31 to pivot relative to the bridge 16.

The embodiment of the invention shown in FIGS. 8-10 is only slightly different from the embodiment shown in FIGS. 6 and 7 and comprises a split lens rim 51 having a channel portion 52 extending generally across the top of the lens rim, much like channel 13 of the embodiment shown in FIG. 1. The lens rim 51 is split, as indicated at 53, to permit the insertion of a lens 54 therein. The split portions of the lens rim are retained together by means of a small connecting bolt 55 in a conventional manner. A hinge indicated generally by reference numeral 56 is provided for mounting suitable temples on the lens rims. The hinge 56 comprises a block portion 57 adapted to be fitted within a cutout portion 58 formed in lens rim 51 and a plaquette 59 formed with a pair of pins 60 functions to retain the block portion 57 of the hinge 56 in rigid assembly with the lens rim 51. The connecting bolt 55 is arranged so that its end is received within a threaded opening 61 formed in block portion 57.

The bridge member 16 is formed with spring members 62 which are adapted to lie within channels 52 with their terminating tangs 63 and 64 received within corresponding openings 65 and 66 in the lens rims 51. Thus, the spring members 52 retain the lens rims 51 and bridge 16 in assembly in the same manner as in the embodiments shown in FIGS. 1–7.

It is contemplated that changes and modifications may be made in the present invention without departing from the spirit or scope thereof.

What is claimed is:

An ophthalmic mounting comprising a pair of left and right lens rims, a pair of left and right temples respectively hinged at the outer edge of the respective lens rims, each of said lens rims including means defining a channel extending at least partially across the top and around the outer edge of said lens rims past the respective hinges, said channel terminating at its opposed ends in inwardly extending openings, a bridge member formed with a pair of generally oppositely directed spring members, and said spring members each being formed with a generally inwardly directed tang at either end thereof, whereby said bridge spring members are respectively adapted to be received within said channels and said tangs to be received within said openings and enclosed by the lens rims for retaining the lens rims and temples in assembly with the bridge and its projecting spring members, the portions of said spring members disposed in the outer edges of said lens rims being effective to minimize the tendency for the lens rims to tilt to an unaligned position relative to said bridge member.

References Cited in the file of this patent
UNITED STATES PATENTS

| | | |
|---|---|---|
| 2,155,693 | Tanasso et al. | Apr. 25, 1939 |
| 2,254,746 | Line | Sept. 2, 1941 |
| 2,284,630 | Banks | June 2, 1942 |
| 2,655,835 | Salierno | Oct. 20, 1953 |
| 2,786,391 | Lutes | Mar. 26, 1957 |

FOREIGN PATENTS

| | | |
|---|---|---|
| 458,492 | Canada | Aug. 2, 1949 |
| 644,175 | Great Britain | Oct. 4, 1950 |
| 671,693 | Great Britain | May 7, 1952 |
| 1,083,548 | France | June 30, 1954 |